US009226323B2

(12) United States Patent
Yu et al.

(10) Patent No.: US 9,226,323 B2
(45) Date of Patent: Dec. 29, 2015

(54) METHOD AND APPARATUS FOR TRANSMITTING RELAY FRAME IN WIRELESS COMMUNICATION SYSTEM

(75) Inventors: Heejung Yu, Daejeon-si (KR); Il Gu Lee, Seoul (KR); Hun Sik Kang, Daejeon-si (KR); Sok Kyu Lee, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1006 days.

(21) Appl. No.: 13/351,205

(22) Filed: Jan. 16, 2012

(65) Prior Publication Data
US 2012/0182926 A1 Jul. 19, 2012

(30) Foreign Application Priority Data
Jan. 14, 2011 (KR) .................. 10-2011-0004223

(51) Int. Cl.
*H04W 76/02* (2009.01)
*H04W 74/08* (2009.01)
*H04W 84/04* (2009.01)
*H04W 84/12* (2009.01)
*H04W 88/04* (2009.01)

(52) U.S. Cl.
CPC .......... *H04W 76/02* (2013.01); *H04W 74/0816* (2013.01); *H04W 84/047* (2013.01); *H04W 84/12* (2013.01); *H04W 88/04* (2013.01)

(58) Field of Classification Search
None
See application file for complete search history.

(56) References Cited

U.S. PATENT DOCUMENTS

| 7,352,770 | B1* | 4/2008 | Yonge et al. | 370/445 |
| 8,213,356 | B2* | 7/2012 | Hart et al. | 370/328 |
| 8,493,943 | B1* | 7/2013 | Segall et al. | 370/338 |
| 8,588,248 | B2* | 11/2013 | Park et al. | 370/461 |
| 9,066,287 | B2* | 6/2015 | Merlin et al. | 1/1 |
| 2002/0021694 | A1* | 2/2002 | Benayoun et al. | 370/386 |
| 2002/0090949 | A1* | 7/2002 | Stanforth | 455/445 |

(Continued)

FOREIGN PATENT DOCUMENTS

KR 1020070094461 A 9/2007

OTHER PUBLICATIONS

"Part 11: Wireless LAN Medium Access Control (MAC) and Physical Layer (PHY) Specifications Amendment 4: Enhancements for Very High Throughput for Operation in Bands below 6 GHz", IEEE Std 802.11 AC 2013.*

(Continued)

*Primary Examiner* — Ayaz Sheikh
*Assistant Examiner* — Faiyazkhan Ghafoerkhan

(57) ABSTRACT

A method and apparatus for transmitting a relay frame in a relay end are provided. The method includes: receiving a relay request frame requesting data transmission to a receive end from a transmit end; transmitting a relay response frame including information on data to be relayed to each of the transmit end and the receive end; receiving the data from the transmit end; and generating a relay frame including the data to transmit the relay frame to the receive end. According to the present invention, the data is transmitted to the receive end positioned outside a transmission coverage of the transmit end, such that a wireless LAN service coverage may be expanded, and an adjacent terminal connected to the receive end is used as the relay end, such that the transmit end that may not be connected directly to the receive end may communicate with the receive end.

20 Claims, 10 Drawing Sheets

(56) References Cited

U.S. PATENT DOCUMENTS

| | | | |
|---|---|---|---|
| 2002/0154653 A1* | 10/2002 | Benveniste | 370/447 |
| 2003/0174665 A1* | 9/2003 | Benveniste | 370/317 |
| 2004/0143681 A1* | 7/2004 | Benveniste | 709/249 |
| 2004/0258012 A1* | 12/2004 | Ishii | 370/328 |
| 2005/0058104 A1* | 3/2005 | Yomo et al. | 370/335 |
| 2005/0174950 A1* | 8/2005 | Ayyagari | 370/254 |
| 2005/0206554 A1* | 9/2005 | Yamaura | 342/70 |
| 2006/0056382 A1* | 3/2006 | Yamada et al. | 370/349 |
| 2006/0166683 A1* | 7/2006 | Sharma et al. | 455/456.5 |
| 2006/0198477 A1* | 9/2006 | Moorti et al. | 375/347 |
| 2006/0212910 A1* | 9/2006 | Endres et al. | 725/73 |
| 2006/0246942 A1* | 11/2006 | Ramachandran et al. | 455/553.1 |
| 2006/0256743 A1* | 11/2006 | Lee et al. | 370/278 |
| 2006/0271969 A1* | 11/2006 | Takizawa et al. | 725/81 |
| 2006/0281404 A1* | 12/2006 | Lee et al. | 455/11.1 |
| 2007/0037548 A1* | 2/2007 | Sammour et al. | 455/343.2 |
| 2007/0100396 A1* | 5/2007 | Freeberg | 607/60 |
| 2007/0206628 A1* | 9/2007 | Nishio et al. | 370/445 |
| 2008/0137585 A1* | 6/2008 | Loyola et al. | 370/315 |
| 2008/0170551 A1* | 7/2008 | Zaks | 370/338 |
| 2008/0310348 A1* | 12/2008 | Nandagopalan et al. | 370/328 |
| 2009/0003216 A1* | 1/2009 | Radunovic et al. | 370/237 |
| 2009/0080366 A1* | 3/2009 | Shao et al. | 370/315 |
| 2009/0092039 A1* | 4/2009 | Niu et al. | 370/208 |
| 2009/0232004 A1* | 9/2009 | Suzuki et al. | 370/241 |
| 2010/0020739 A1* | 1/2010 | Chou et al. | 370/315 |
| 2010/0039974 A1* | 2/2010 | Toshimitsu et al. | 370/311 |
| 2010/0177657 A1* | 7/2010 | Kim et al. | 370/252 |
| 2010/0189005 A1* | 7/2010 | Bertani et al. | 370/252 |
| 2010/0260094 A1* | 10/2010 | Gruber et al. | 370/315 |
| 2011/0032864 A1* | 2/2011 | Lee et al. | 370/315 |
| 2011/0110290 A1* | 5/2011 | Erkip et al. | 370/315 |
| 2012/0155370 A1* | 6/2012 | Yeh et al. | 370/315 |
| 2013/0034045 A1* | 2/2013 | Kwon et al. | 370/315 |
| 2013/0077555 A1* | 3/2013 | Gao et al. | 370/312 |

OTHER PUBLICATIONS

"Part 11: Wireless LAN Medium Access Control (MAC) and Physical Layer (PHY) specifications Amendment 4: Further Higher Data Rate Extension in the 2.4 GHz Band", IEEE Std 802.11g, 2003.*

Garmonov, Alexandre V., "Joint Fragment Size and Transmission Rate Optimization for Request-to-Send/Clear-to-Send Mechanism of IEEE 802.1 lb Distributed Coordination Function", IEEE 2005.*

He, Xin, "Cooperative RTS/CTS MAC with Relay Selection in Distributed Wireless Networks", IEEE 2009.*

Mjeku, Majlinda, "Analysis of the Request to Send/Clear to Send Exchange in WLAN Over Fiber Networks", Journal of Lightwave Technology, vol. 26, No. 15, Aug. 1, 2008.*

Shihong Zou et al., "A Relay-Aided Media Access (RAMA) Protocol in Multirate Wireless Networks", IEEE Transactions on Vehicular Technology, Sep. 2006, pp. 1657-1667, vol. 55, No. 5, IEEE.

* cited by examiner

FIG. 5
(a) 
(b) 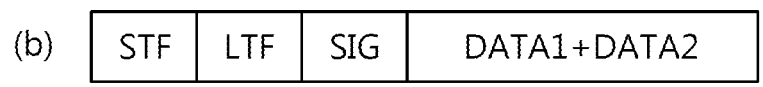

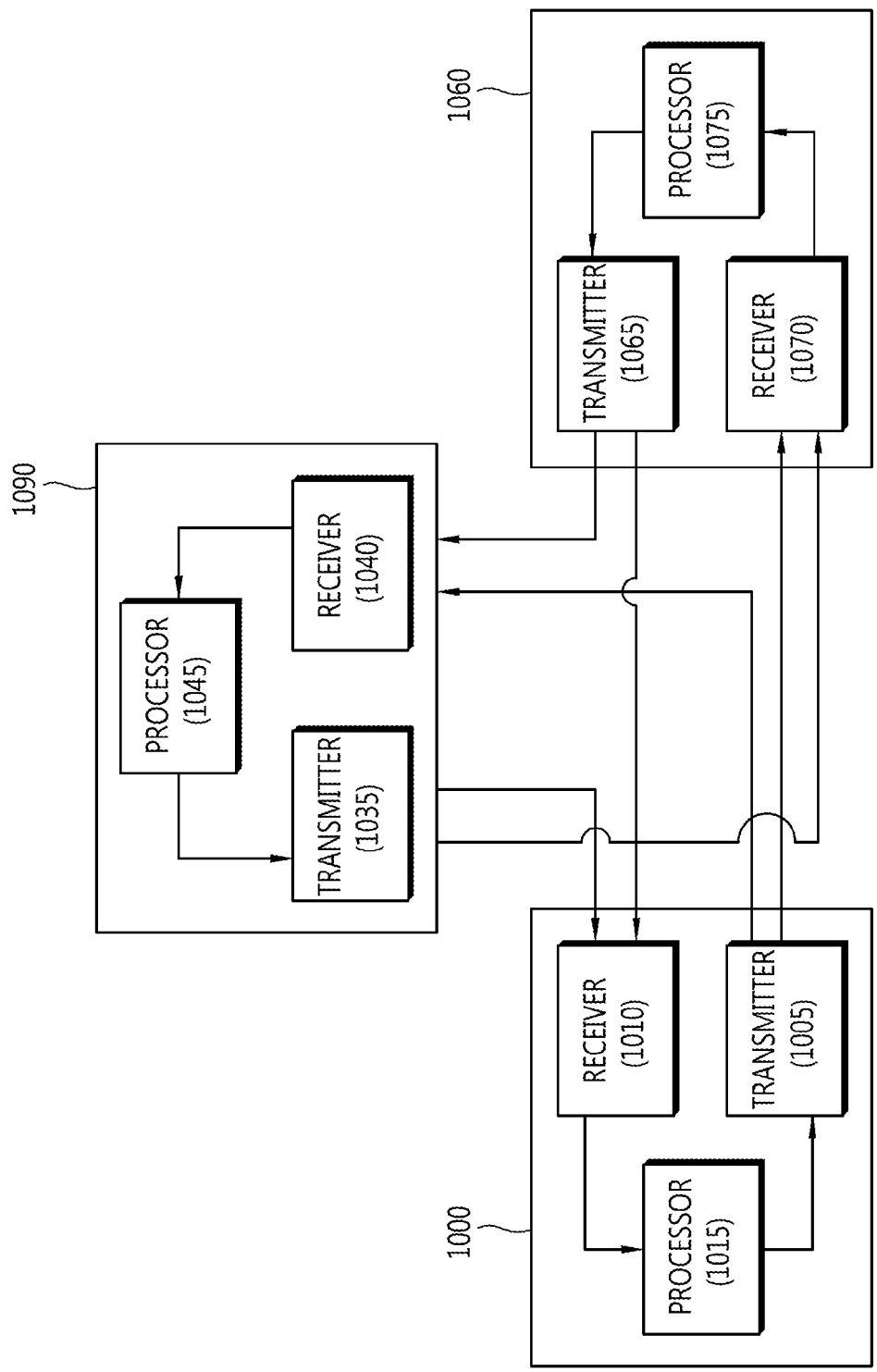

METHOD AND APPARATUS FOR TRANSMITTING RELAY FRAME IN WIRELESS COMMUNICATION SYSTEM

CROSS-REFERENCE TO RELATED APPLICATIONS

This application claims the benefit of priority of Korean Patent Application No. 10-2011-0004223 filed on Jan. 14, 2011 and Korean Patent Application No. 10-2012-0004358 filed on Jan. 13, 2012, all of which is incorporated by reference in its entirety herein.

BACKGROUND OF THE INVENTION

1. Field of the Invention

The present invention relates to a wireless communication system, and more particularly, to wireless communication using a relay technology.

2. Related Art

A wireless local area network (LAN) technology has been prominent as a wireless communication technology providing a high speed data service in an unlicensed band. Unlike an existing cellular system, in the wireless LAN technology, since an access point (AP) serving as a base station is operated when a power supply thereof is connected to a wired network, the access point may be easily installed by anyone and data communication may be performed at a low cost, such that the wireless LAN technology has been generalized.

The wireless LAN technology has an advantage in which a decentralized operation is simple and has also been spread to a sensor network and a smart utility network. In the case of the sensor network and the smart utility network, since an amount of data to be transmitted is not much and a transmission period of the data is also short, it is more important to expand a service coverage than to increase a transmission data rate.

Most of wireless LAN transmission specifications have been developed in a form in which a multi-antenna is used in order to increase a transmission rate or a bandwidth is expanded. As typical examples thereof, there are institute of electrical and electronics Engineers (IEEE) 802.11n and IEEE 802.11ac. However, in a general network environment, the increase in a transmission rate as described above is significantly important in view of an increase in network capacity; however, in a network for collecting information such as the sensor network, it is more important to expand a coverage. In the case in which the coverage is expanded, since information may be collected in a wide area through a small number of APs, the sensor network may be build at a low cost.

As coverage increasing schemes adopted in existing communication systems, a channel coding scheme having a low code rate, a repetition scheme in which decoding may be performed in a low signal-to-noise ratio, or a beamforming scheme of allowing a high power signal to arrive at a desired receive end may be used. However, in these schemes, a physical layer specification is significantly modified or a cost burden problem due to use of a plurality of antennas is caused. Therefore, a technology of increasing a coverage in a wireless LAN system, particularly, a technology of increasing a service area of a wireless LAN using a relay technology has been demanded.

A relay scheme means a scheme of relaying and transmitting data received from a transmit end to a receive end using an idle terminal between the transmit end and the receive end as a relay terminal A system such as the 3rd generation partnership project (3GPP) long term evolution (LTE) and IEEE 802.16 adopts a relay scheme in a form in which a basestation performs all controls by changing a frame structure, thereby making it possible to obtain an effect such as expansion of a coverage, or the like. However, in the case of the wireless LAN, since there is no base station performing a centralized control function, after a relay link is set in a handshaking scheme of the wireless LAN, relay transmission starts. Since an object of a scheme of adding a relay function in the wireless LAN is to improve a transmission rate rather than to expand a coverage, a handshaking protocol that may be used only in the case in which both of a relay end and a receive end are present in a transmission coverage of a transmit end has been defined.

Therefore, there is a need for a method for transmitting data to a receive end positioned outside a transmission coverage of a transmit end.

SUMMARY OF THE INVENTION

The present invention provides a method and apparatus for transmitting a relay frame in a wireless communication system.

The present invention also provides a handshaking method in which a control frame and a data frame are exchanged in order to set a relay scheme and a relay link.

The present invention also provides a method and apparatus for configuring a relay frame capable of transmitting data of a transmit end and data of a relay end.

The present invention also provides a method and apparatus for expanding a wireless LAN service coverage using an IEEE 802.11 MAC protocol.

In an aspect, a method for transmitting a relay frame in a relay end of a wireless communication system is provided. The method includes: receiving a relay request frame requesting data transmission to a receive end from a transmit end; transmitting a relay response frame including information on data to be relayed to each of the transmit end and the receive end; receiving the data from the transmit end; and generating a relay frame including the data to transmit the relay frame to the receive end.

The relay end may be at least one terminal or access point.

The relay end may be a terminal selected among neighboring terminals based on at least one of strength of received signal in the transmit end, a transmission rate of the received signal, and a destination address.

The method may further include retransmitting a frame including the data to the transmit end, wherein the frame including the data includes ACK information of the relay end.

The method may further include: receiving a request-to-send (RTS) frame blocking interference due to signal transmission of neighboring terminals from the transmit end; and transmitting the RTS frame to the receive end.

The relay response frame may include RTS information.

The method may further include: receiving a clear-to-send (CTS) frame indicating that the receive end is ready to receive data to admit transmission, from the receive end; and transmitting the CTS frame to the transmit end.

The method may further include: receiving an ACK frame indicating that the receive end successfully receives the data, from the receive end; and transmitting the ACK frame to the transmit end.

The relay request frame may be transmitted when the receive end is positioned outside a transmission area of the transmit end.

In the case in which a beacon frame is not received at a transmit end, it may be judged that the receive end is positioned outside the transmission area of the transmit end.

The relay frame may be a frame of institute electrical and electronics engineers (IEEE) 802.11a/g specifications.

The relay frame may be configured by completely demodulating the data or the relay request frame and then modulating again the demodulated data or relay request frame.

The relay frame may further include data of the relay end itself to be transmitted to the receive end.

The relay frame may be configured by adjusting a gain and compensating for a carrier frequency offset in the data or the relay request frame.

The relay frame may further include data of the relay end itself to be transmitted to the receive end.

Each of the data of the transmit end and the data of the relay end itself may include a source address, a destination address, and length information according to a media access control (MAC) frame format.

In another aspect, a terminal for transmitting a relay frame in a wireless communication system is provided. The terminal includes: a receiver receiving a relay request frame requesting data transmission to a receive end from a transmit end; and a transmitter transmitting a relay response frame including information on which data is relayed to each of the transmit end and the receive end, wherein the receiver receives data from the transmit end, and the transmitter transmits a relay frame including the data to the receive end.

BRIEF DESCRIPTION OF THE DRAWINGS

FIGS. 5A and 5B are diagrams showing an example of a structure of a physical layer relay frame according to an exemplary embodiment of the present invention.

FIG. 10 is a block diagram showing an example of a wireless communication system performing a relay operation according to an exemplary embodiment of the present invention.

DESCRIPTION OF EXEMPLARY EMBODIMENTS

Figure 1:
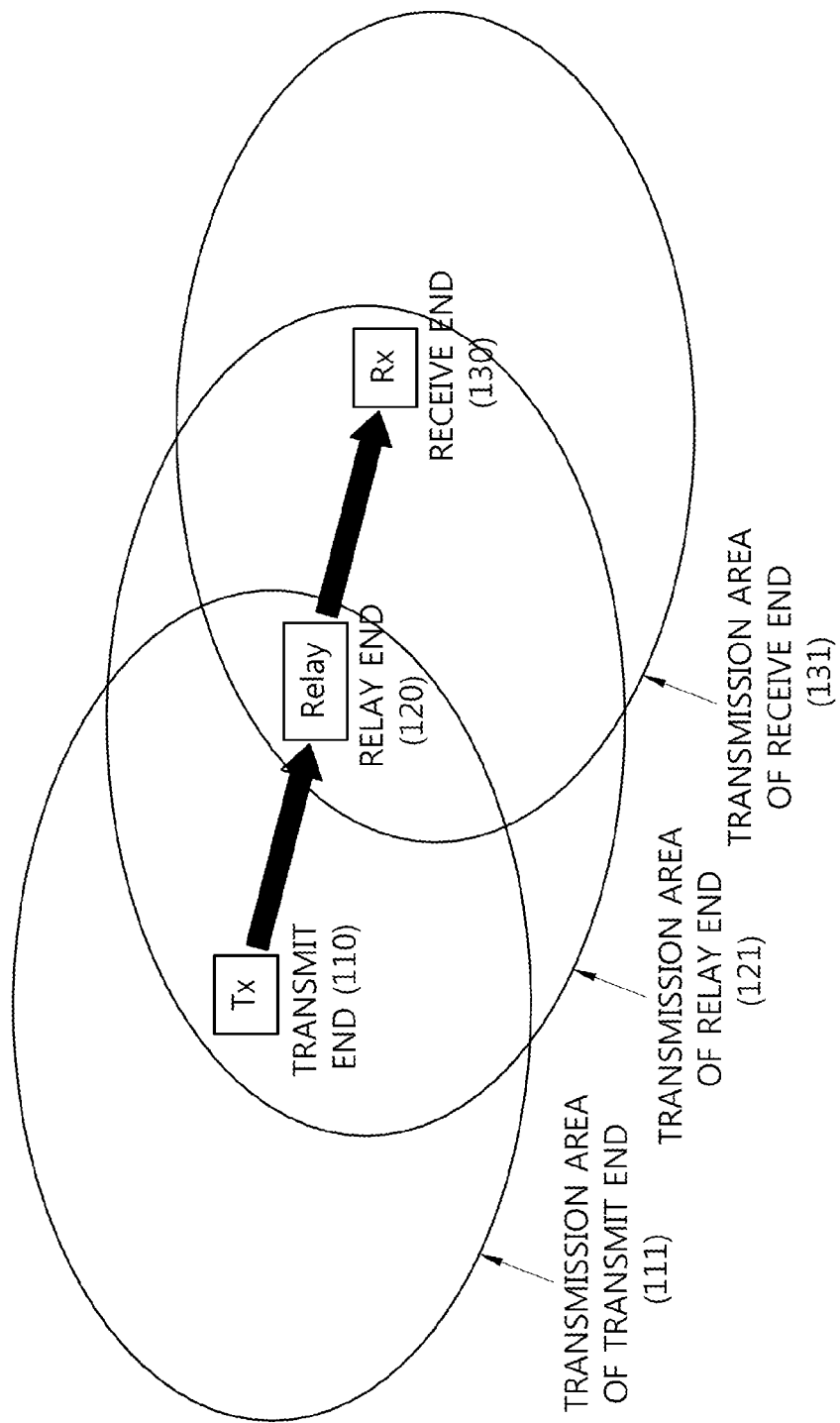
FIG. 1 is a diagram showing an example of a wireless communication system transmitting a signal using a relay end.

FIG. 1 is a diagram showing an example of a wireless communication system transmitting a signal using a relay end.

Referring to FIG. 1, the wireless communication system includes a transmit end 110, a relay end 120, and a receive end 130.

The receive end 130 is positioned outside a transmission 111 area of the transmit end. The transmission area (or a coverage) of the transmit end 110 indicates a spatial area in which when the transmit end 110 transmits a frame at the minimum transmission rate, the receive end 130 may demodulate the frame. The relay end 120 is positioned at a common area between the transmit end 110 and the receive end 130. Therefore, both of the transmit end 110 and the receive end 130 are positioned in a transmission area 121 of the relay end 120.

The transmit end 110 transmits a signal to the relay end 120 in order to transmit the signal to the receive end 130, and the relay end 120 transmits the signal received from the transmit end 110 to the receive end 130.

Figure 2:
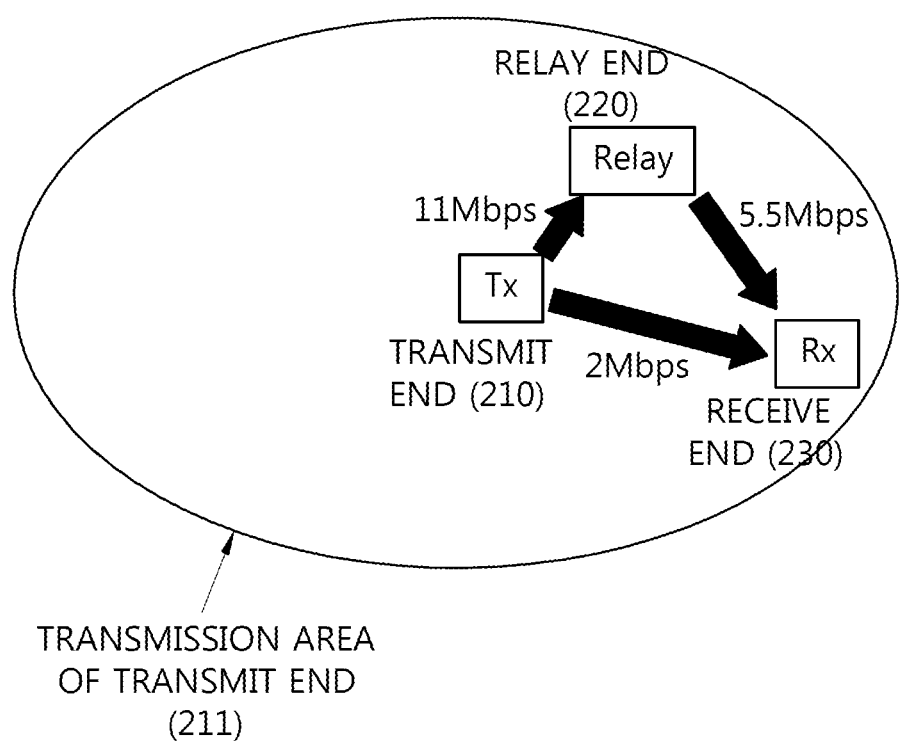
FIG. 2 is a diagram showing another example of a wireless communication system transmitting a signal using a relay end.

FIG. 2 is a diagram showing another example of a wireless communication system transmitting a signal using a relay end.

Referring to FIG. 2, the wireless communication system includes a transmit end 210, a relay end 220, and a receive end 230.

Both of the relay end 220 and the receive end 230 are positioned in a transmission area 211 of the transmit end. However, a distance between the transmit end 210 and the receive end 230 is more distant from a distant between the relay end 220 and the transmit end 230. The transmit end 210 may transmit a signal to the relay end 220 at a transmission rate of 11 Mbps; however, it may transmit a signal to the receive end 230 at a transmission rate of 2 Mbps. The relay end 220 may transmit a signal to the receive end 230 at a transmission rate of 5.5 Mbps.

Therefore, it is more efficient for the transmit end 210 to transmit the signal to the receive end 230 through the relay end 220 than to transmit the signal directly to the receive end 230. When calculation is performed without considering overheads of a physical layer and a media access control (MAC) layer, the transmit end 210 may transmit the signal to the receive end 230 through the relay end 220 at an average transmission rate of 8.25 Mbps (=(11+5.5)/2).

In the case in which the receive end and the relay end are positioned in the transmission area of the transmit end as shown in FIG. 2, since all terminals may receive a request-to-send (RTS) and a clear-to-send (CTS), which are control frames for securing a right to use a channel, a handshaking process for setting a relay link is relatively easy. On the other hand, in the case in which the transmit end is positioned outside the transmission area of the receive end and the receive end is positioned outside the transmission area of the transmit end as shown in FIG. 1, the handshaking process for setting a relay link is complicated.

Meanwhile, the present invention may be applied to both of the wireless communication system as shown in FIG. 1 and the wireless communication system as shown in FIG. 2.

Figure 3:
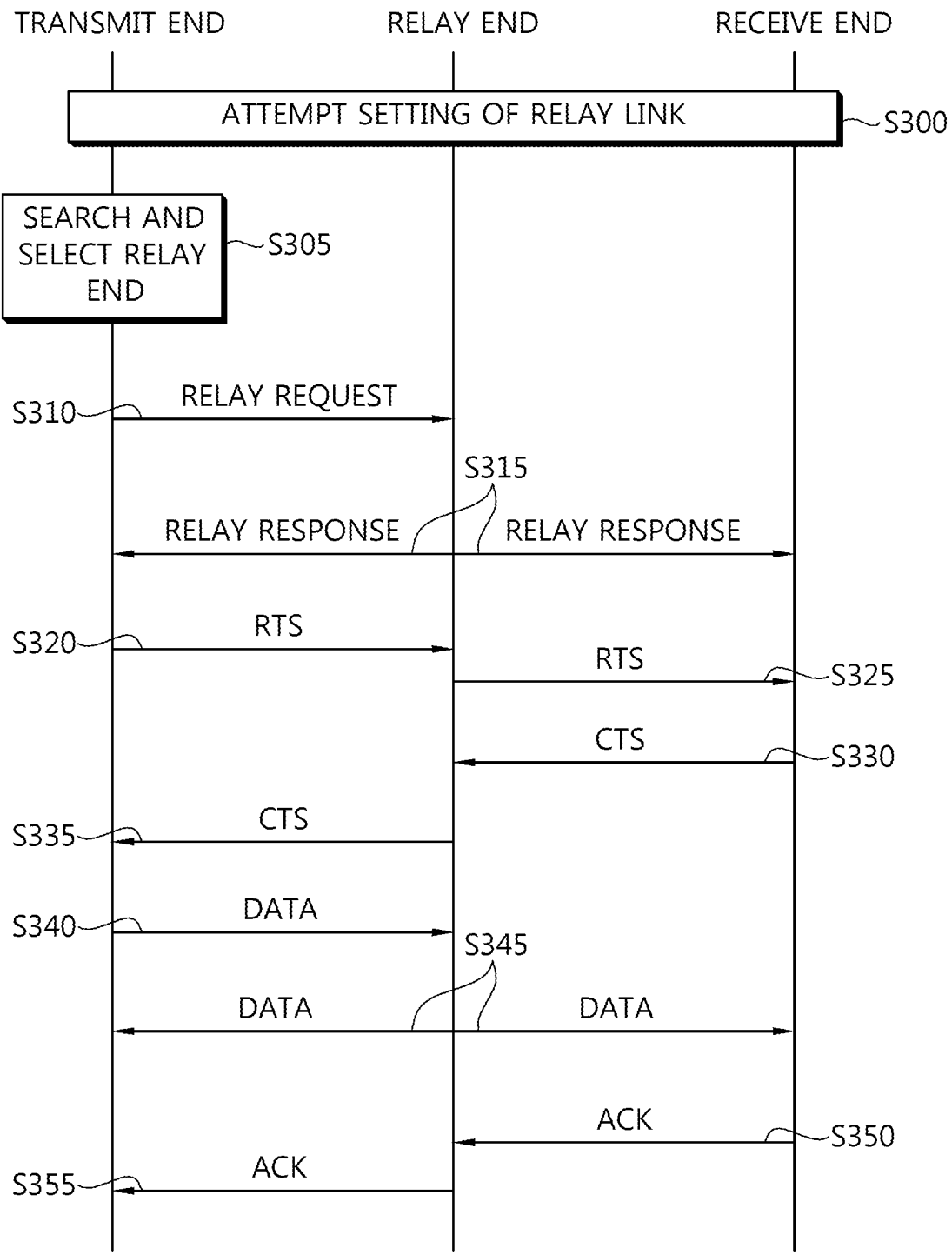
FIG. 3 is a flow chart showing an example of a handshaking process of transmitting and receiving frames among a transmit end, a receive end, and a relay end in a wireless communication system in which the transmit end is positioned outside a transmission area of the receive end according to an exemplary embodiment of the present invention.

FIG. 3 is a flow chart showing an example of a handshaking process of transmitting and receiving frames among a transmit end, a receive end, and a relay end in a wireless communication system in which the transmit end is positioned outside a transmission area of the receive end according to an exemplary embodiment of the present invention. Although FIG. 3 shows a process in which the transmit end transmits a signal data frame to the receive end, this process is only an example. That is, a plurality of data frames may also be transmitted at short inter-frame spaces (SIFSs). Meanwhile, each of the transmit end, the receive end, and the relay end may be an access point (AP).

Referring to FIG. 3, setting of a relay link between the transmit end and the receive end is attempted (S300). When the transmit end is positioned outside a transmission area of the receive end, the transmit end may not receive a control frame (for example, a beacon frame) periodically transmitted by the receive end. Therefore, an existing wireless local access network (LAN) may not configure a basic service set (BSS). In this case, the transmit end judges that there is no accessible receive end.

The transmit end searches and selects the relay end (S305). Even though the transmit end may not receive the control frame periodically transmitted by the receive end, the transmit end may receive a frame that neighboring other terminals (or APs) transmit to the receive end. The neighboring other terminals (or APs) may become a candidate of a relay terminal. The transmit end selects one of the neighboring other terminals (or APs) as a relay end. As an example, the transmit end selects the relay end among the neighboring other terminals (or APs) based on at least one of strength of a received signal, a transmission rate of the received signal, and a destination address.

The transmit end transmits a relay request frame to the selected relay end to request relay transmission (S310). The relay end receiving the relay request judges whether it may perform the relay transmission to the receive end. Whether or not the relay end accepts the relay transmission may be determined based on a queue state of the relay end or the receive end, a power state thereof, whether or not the relay end performs relay transmission for another terminal, or the like.

When the relay end may perform the relay transmission to the receive end, the relay end performs a response indicating that it accepts the relay transmission by transmitting a relay response frame to each of the transmit end and the receive end (S315).

The transmit end receiving the relay response may confirm that the relay end may perform the relay transmission, and the receive end receiving the relay response may also confirm data of which transmit end the relay end relays and transmits.

In this case, the transmit end may repeat the relay request until it receives the relay response indicating that the relay end accepts the relay transmission from the relay end.

In order to previously block interference due to transmission of neighboring terminals to prevent collision, the transmit end transmits a request-to-send (RTS) frame (or RTS information) to the relay end (S320) and also transmits the RTS frame (or the RTS information) to the receive end (S325).

The receive end transmits a clear-to-send (CTS) frame (or CTS information) indicating that the receive end is ready to receive data to admit transmission, to the relay end (S330), and the relay end transmits the CTS frame (or the CTS information) to the receive end (S335). Through the above-mentioned processes, an opportunity that the transmit end may transmit data to the receive end without interference or hindrance may be guaranteed to the transmit end.

The transmit end transmits a data frame to the relay end (S340), and the relay end transmits the data frame to the receive end (S345). Here, when the data frame that the relay end transmits to the receive end is also transmitted to the transmit end, the data frame serves to an acknowledgement (ACK) indicating that the relay end receives the data frame from the transmit end.

The receive end receiving the data frame transmits an ACK frame to the relay end (S350), and the relay end transmits the ACK frame to the transmit end (S355). This is a process of confirming that the data frame transmitted from the transmit end was received in the receive end.

According to the exemplary embodiment of the present invention, a data transmission rate between the transmit end and the receive end is reduced; however, a service coverage of the wireless LAN is expanded. Therefore, the present invention is advantageous for an application, or the like, of a sensor network requiring a wide coverage rather than a high transmission rate.

Figure 4:
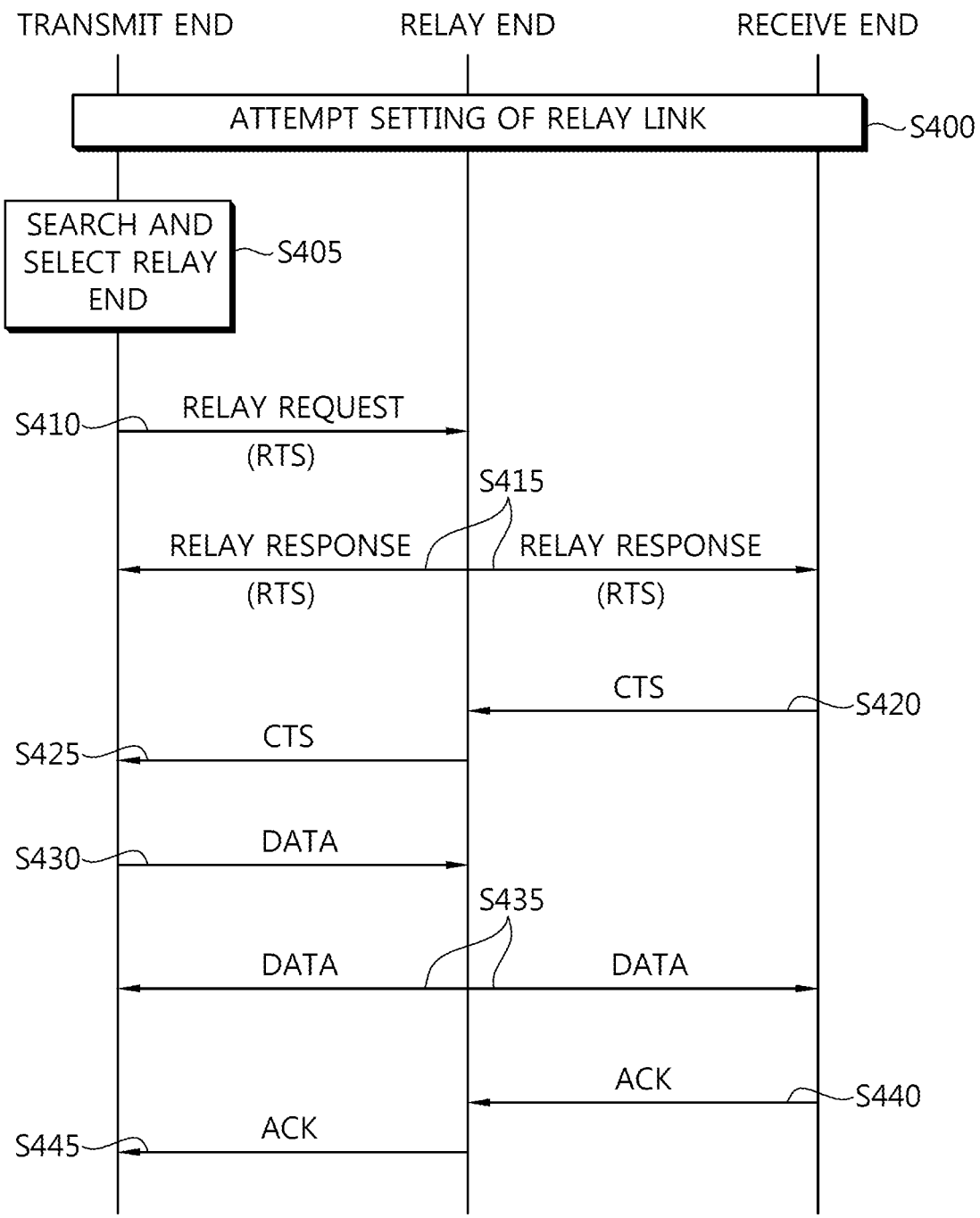
FIG. 4 is a flow chart showing another example of a handshaking process of transmitting and receiving frames among a transmit end, a receive end, and a relay end according to an exemplary embodiment of the present invention.

FIG. 4 is a flow chart showing another example of a handshaking process of transmitting and receiving frames among a transmit end, a receive end, and a relay end according to an exemplary embodiment of the present invention. Although FIG. 4 shows a process in which the transmit end transmits a signal data frame to the receive end, this process is only an example of the present invention. That is, a plurality of data frames may also be transmitted at SIFSs. Each of the transmit end, the receive end, and the relay end may be an AP.

Referring to FIG. 4, setting of a relay link between the transmit end and the receive end is attempted (S400). Since the transmit end is positioned outside a transmission area of the receive end, when the transmit end may not receive a control frame (for example, a beacon frame) periodically transmitted by the receive end, an existing wireless LAN may not configure BSS. In this case, the transmit end judges that there is no accessible receive end.

The transmit end searches and selects the relay end (S405). Even though the transmit end may not receive the control frame periodically transmitted by the receive end, the transmit end may receive a frame that neighboring other terminals (or APs) transmit to the receive end. The neighboring other terminals (or APs) may become a candidate of a relay terminal. The transmit end selects one of the neighboring other terminals (or APs) as a relay end. As an example, the transmit end selects the relay end among the neighboring other terminals (or APs) based on at least one of strength of a received signal, a transmission rate of the received signal, and a destination address.

The transmit end transmits a relay request frame to the selected relay end to request relay transmission (S410). Here, the relay request frame may include information of a RTS frame in order to previously block interference due to transmission of neighboring terminals to prevent collision. Therefore, a separate RTS frame needs not to be transmitted. The relay end receiving the relay request judges whether it may perform the relay transmission to the receive end. Whether or not the relay end accepts the relay transmission may be determined based on a queue state of the relay end or the receive end, a power state thereof, whether or not the relay end performs relay transmission for another terminal, or the like.

When the relay end may perform the relay transmission to the receive end, the relay end performs a response indicating that it accepts the relay transmission by transmitting a relay response frame to each of the transmit end and the receive end (S415).

Here, the relay response frame may include information of a RTS frame in order to previously block interference due to transmission of neighboring terminals to prevent collision. In this case, a separate RTS frame needs not to be transmitted.

The transmit end receiving the relay response may confirm that the relay end may perform the relay transmission, and the receive end receiving the relay response may also confirm data of which transmit end the relay end relays and transmits.

In this case, the transmit end may repeat the relay request until it receives the relay response indicating that the relay end accepts the relay transmission from the relay end.

The receive end transmits a CTS frame indicating that the receive end is ready to receive data to admit transmission, to the relay end (S420), and the relay end transmits the CTS frame to the receive end (S425). Through the above-mentioned processes, an opportunity that the transmit end may transmit data to the receive end may be guaranteed to the transmit end.

The transmit end transmits a data frame to the relay end (S430), and the relay end generates a relay frame including the data frame and transmits the relay frame to the receive end (S435). Here, when the data frame that the relay end transmits to the receive end is also transmitted to the transmit end, the data frame serves to an acknowledgement (ACK) indicating that the relay end receives the data frame.

The receive end receiving the data frame transmits an ACK frame to the relay end (S440), and the relay end transmits the ACK frame to the transmit end (S445). This is a process of confirming that the data frame transmitted from the transmit end was received in the receive end.

As another example, similar to FIG. 4, a relay link may also be formed by defining a frame including both of functions of a relay response frame and a CTS frame.

Hereinafter, a method for generating a relay frame in a relay end according to an exemplary embodiment of the present invention will be described.

The relay frame has two structures. More specifically, there are a relay frame (Example 1) configured by completely demodulating a frame received from the transmit end and then modulating again the demodulated frame, in the relay end, and a relay frame (Example 2) configured by adjusting a gain and compensating for a carrier frequency offset in a frame received from the transmit end without completely demodulating the frame received from the transmit end, in the relay end. Further, with respect to each example, there are a case in which data of the relay end itself to be transmitted from the relay end to a receive end is included and a case in which the data is not included.

FIGS. 5A and 5B are diagrams showing an example of a structure of a physical layer relay frame according to an exemplary embodiment of the present invention. The relay frames of FIGS. 5A and 5B are relay frames again configured by demodulating all of the received data and then allowing data that the relay end itself is to transfer to the receive end to be included therein according to a situation, in the relay end.

Referring to FIGS. 5A and 5B, in the case in which the relay end demodulates and then modulates again the received frame, the relay frame has a physical layer frame configuration with a structure such as a non-relay frame.

The relay frame may be configured using a frame structure of IEEE 802.11a/g.

In addition, a relay frame of FIG. 5A is a relay frame including only a data field DATA1 to be relayed since there is not data to be transmitted in the relay end, and a relay frame of FIG. 5B is a relay frame including both of the data field DATA1 to be relayed and a data field DATA2 of the relay end itself.

Both of the relay frames of FIGS. 5A and 5B include a short training field (STF), a long training field (LTF), and a signal field SIG at a front portion thereof.

The SFT includes at least one of packet detection related information, automatic gain control (AGC) related information, coarse carrier frequency offset (CFO) estimation related information, and time synchronization related information.

The LTF includes fine carrier offset estimation related information or channel estimation related information.

The signal field includes rate or length information. The rate may be a transmission rate.

The data field DATA1 to be relayed includes a payload of which a source address is the transmit end and a destination address is the receive end, and the data field DATA2 of the relay end itself includes a payload of which a source address is the relay end and a destination address is the receive end. As described above, each of the data fields DATA1 and DATA2 may include the source address, the destination address, length information, and the like, in each payload according to an MAC frame format for each data. Through this, which of two data is relay data of the transmit end or transmission data of the relay end may be distinguished.

Figure 6:
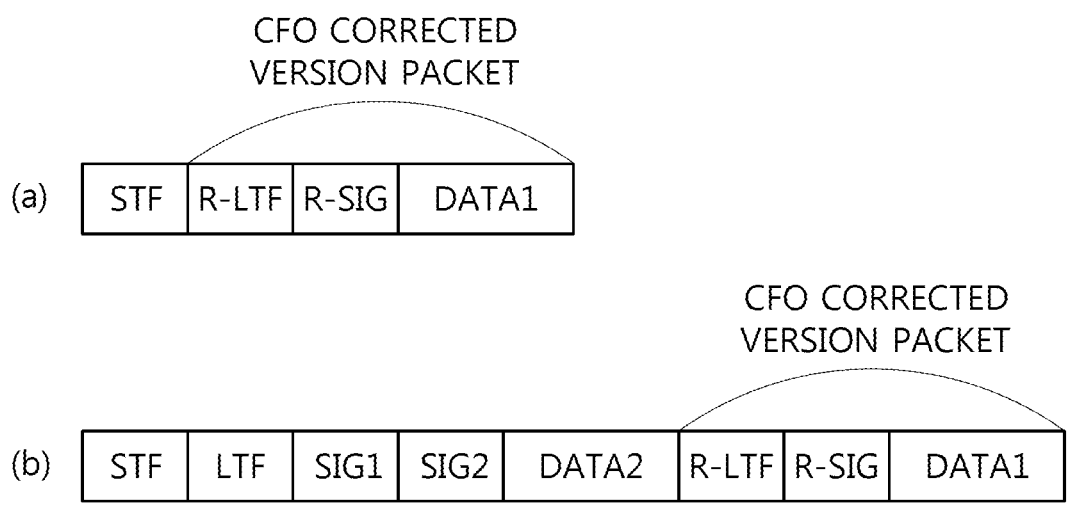
FIGS. 6A and 6B are diagrams showing another example of a structure of a physical layer relay frame according to an exemplary embodiment of the present invention.

FIGS. 6A and 6B are diagrams showing another example of a structure of a physical layer relay frame according to an exemplary embodiment of the present invention. The relay frames of FIGS. 6A and 6B are relay frames configured so that the relay end does not demodulate all of the received data that the relay end is to relay, but first transmits data that the relay end is to transmit, compensates for a carrier frequency offset in the received data that the relay end is to relay, and then transmits the received data in which the carrier frequency offset is compensated for. The reason why the carrier frequency offset is estimated and compensated for in the case in which all of the received frame is not demodulated in the relay end is that the sum of two carrier frequency offsets between the transmit end and the relay end and between the relay end and the receive end may be out of a range of a carrier frequency offset that may be estimated in an existing SFT and LTF structure.

Referring to FIGS. 6A and 6B, a relay frame of FIG. 6A is a relay frame including only a data field DATA1 to be relayed since there is not data to be transmitted in the relay end, and a relay frame of FIG. 6B is a relay frame including both of the data field DATA1 to be relayed and a data field DATA2 of the relay end itself.

The relay frame of FIG. 6A includes an STF. The STF includes at least one of packet detection related information, AGC related information, coarse carrier frequency offset estimation related information, and time synchronization related information. Since the STF is an STF that the relay end receives from the transmit end and is used for packet detection and AGC in the relay end, in the case in which the relay end transmits the received STF as it is, a length and a waveform may not be constant. Therefore, the relay end does not relay the STF.

In addition, the relay frame includes a carrier frequency offset (CFO) corrected version packet including an R-LTF field, an R-SIG field, a DATA1 field. This is a version in which a carrier frequency offset (CFO) is compensated for in the received data transmitted from the transmit end to the relay end. More specifically, in order to receive the frame, a packet is detected, AGC is performed, and the CFO is estimated using the STF and LTF. In addition, time synchronization (a process of searching a start point of the LTF) is also performed. The CFOs are compensated for with respect to all of the received frames based on the estimated CFO. In addition, only the SIG field is demodulated or an end of the frame is predicted based on reception power, such that how many OFDM symbols the length of the received frame corresponds to in an OFDM symbol unit is calculated.

Through this, the CFOs of the LTF, the signal field, and the data field to be transmitted from the transmit end to the receive end are compensated for. However, the STF is not included in this relay part.

Meanwhile, the relay frame of FIG. 6B is a relay frame including a data field of the relay end itself for transmission and further includes a LTF field, a SIG1 field, a SIG2 field, and a DATA2 field, in addition to the relay frame of FIG. 6A.

The SIG1 field includes rate information and length information as in the signal field of FIG. 5. However, the rate information and the length information are set in order to delay transmission of other terminals until a corresponding frame ends, separately from transmission data. Therefore, the rate information is fixed to a predetermined rate, and the length information is set to be the same as a length of the entire relay frame. A function allowing other terminals not to use a channel during transmission of the relay frame by viewing the SIG1 field is called a spoofing function. This is used in IEEE 802.11 specifications.

The SIG2 field includes rate information and length information on an actual data field that the relay end transmits to the receive end.

The DATA2 field is a field including data of the relay end itself.

After the DATA2 field, a new frame structure again starting from an R-LTF is connected. This is a form in which the relay end receives the frame from the transmit end and then transmits the frame in which the CFO is compensated for as it is. The CFOs are compensated for with respect to all of the received frames based on the estimated CFO. In addition, only the signal field is demodulated or an end of the frame is predicted based on reception power, such that how many OFDM symbols the length of the received frame corresponds to in an OFDM symbol unit is calculated.

When the frame in which the CFO is compensated for and the length information of the received frame are included in the relay frame and the data to be transmitted from the relay end to the receive end is present as described above, a length of the relay end data is calculated based on the data, the transmission rate, and the length.

The entire length of the relay frame may be calculated based on the length of the received frame and the length of the relay end data calculated as described above, and the rate information and the length information of the SIG1 field are configured based on the entire length of the relay frame. As an example, after the rate information is fixed to one rate, only the length information may be set to be appropriate for the entire length of the frame.

The DATA2 field may be demodulated through rate information and length information on the DATA2 field transmitted from the relay end to the receive end and included in the SIG2 field.

The relay end performs demodulation for the DATA2 field and then starts demodulation for the DATA1 field transmitted from the transmit end to the receive end. First, the relay end estimates/compensates for a carrier frequency based on the R-LTF, and estimates a channel. The relay end demodulates the R-SIG field based on them to extract the rate information and the length information, and demodulates the DATA1 using the extracted information.

The present invention suggests a scheme of expanding a wireless LAN service area based on existing IEEE 802.11 MAC protocol and physical layer specifications. Particularly, although an IEEE 801.11a/g OFDM physical layer is described by way of example in the present invention, the scope of the present invention is not limited. That is, the present invention may also be applied to other physical layer specifications such as IEEE 802.11n and IEEE 802.11ac.

Figure 7:
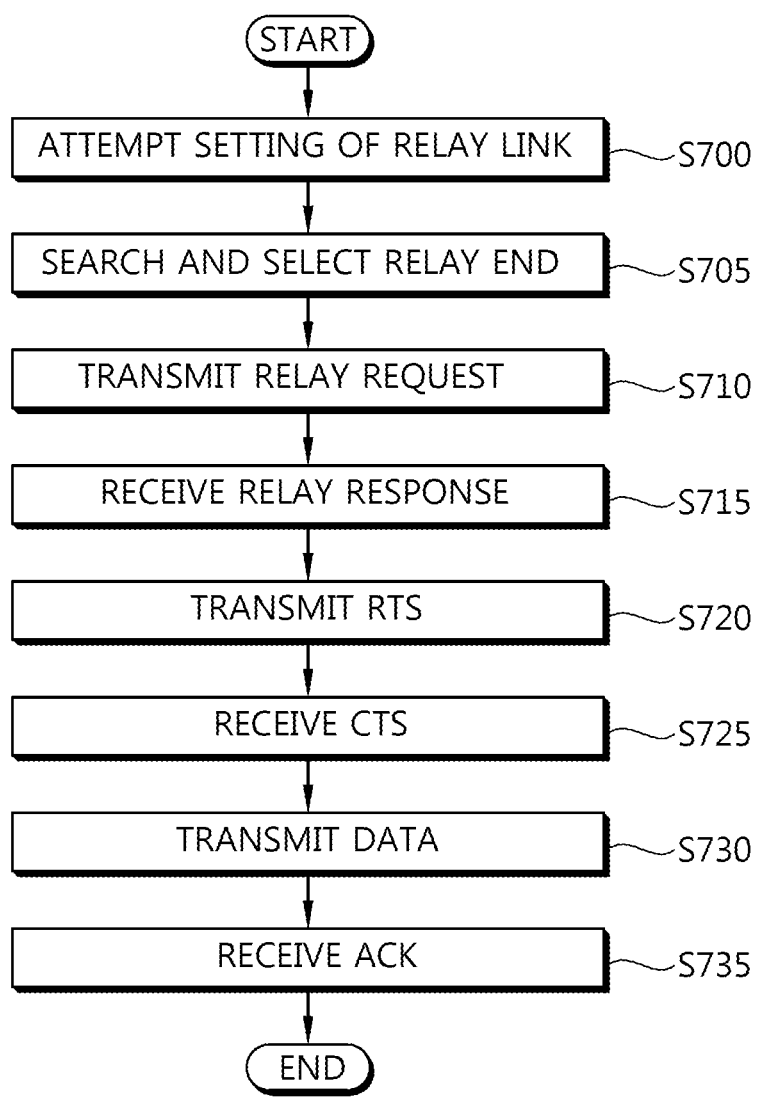
FIG. 7 is a flow chart showing an example of an operation of a transmit end transmitting a frame according to an exemplary embodiment of the present invention.

FIG. 7 is a flow chart showing an example of an operation of a transmit end transmitting a frame according to an exemplary embodiment of the present invention.

Referring to FIG. 7, the transmit end attempts setting of a relay link with the receive end (S700). In the case in which the receive end is positioned outside the transmission area of the transmit end, the transmit end searches and selects the relay end (S705).

The transmit end transmits a relay request frame to the selected relay end (S710). Then, the transmit end may receive a relay response that the relay end transmits to the receive end as a relay response to the relay request (S715).

The transmit end transmits a RTS frame to the relay end in order to previously block interference due to transmission of neighboring terminals to prevent collision (S720). The transmit end receives a CTS frame indicating that the receive end is ready to receive data to admit transmission, through the relay end (S725).

The transmit end transmits data to the relay end (S730), and receives an ACK frame through the relay end in the case in which the receive end appropriately receives the data (S735).

Meanwhile, when the RTS frame is included in the relay request frame, the transmission of the RTS frame may be omitted.

Figure 8:
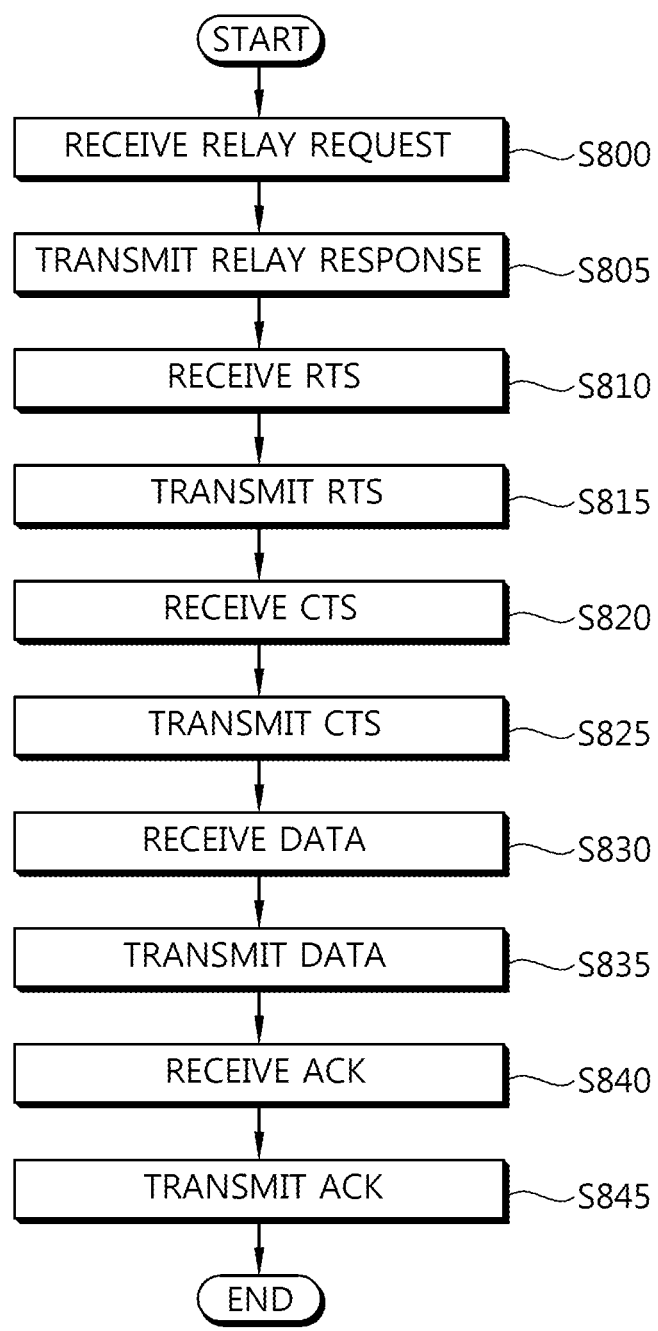
FIG. 8 is a flow chart showing an example of an operation of a relay end relaying a frame according to an exemplary embodiment of the present invention.

FIG. 8 is a flow chart showing an example of an operation of a relay end relaying a frame according to an exemplary embodiment of the present invention.

Referring to FIG. 8, the relay end receives the relay request frame from the transmit end (S800). Then, the relay end transmits the relay response to the relay request to the receive end (or the transmit end) (S805).

The relay end receives the RTS frame from the transmit end in order to previously block the interference due to the transmission of the neighboring terminals to prevent the collision (S810), and transmits the RTS frame to the receive end (S815).

The relay end receives the CTS frame indicating that the receive end is ready to receive data to admit transmission, from the receive end (S820), and transmits the CTS frame to the transmit end (S825).

The relay end receives data from the transmit end (S830), and generates a relay frame including the data to transmit the relay frame to the receive end (S835).

In the case in which the receive end appropriately receive the data, the relay end receives an ACK frame from the receive end (S840) and transmits the ACK frame to the transmit end (S845).

Meanwhile, when the RTS frame is included in the relay request frame, the transmission of the RTS frame may be omitted.

Figure 9:
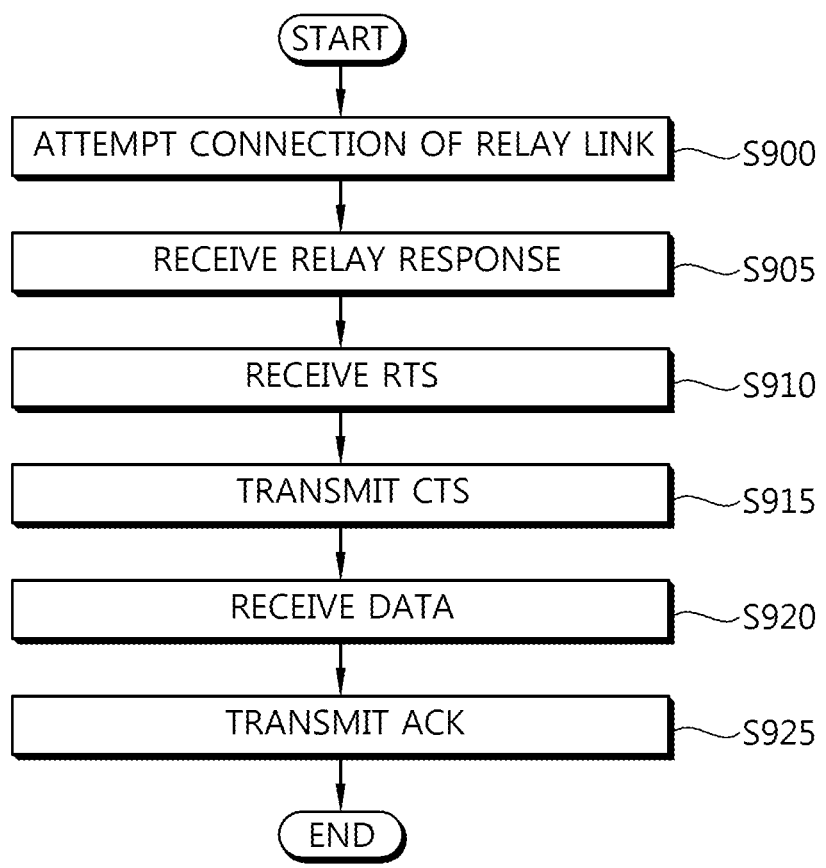
FIG. 9 is a flow chart showing an example of an operation of a receive end receiving a frame according to an exemplary embodiment of the present invention.

FIG. 9 is a flow chart showing an example of an operation of a receive end receiving a frame according to an exemplary embodiment of the present invention.

Referring to FIG. 9, the receive end transmits or receives a control frame to or from the transmit end to attempt connection of a relay link (S900). This is to perform a relay operation in the case in which the receive end is positioned outside a transmission area of the transmit end.

The receive end may receive a relay response from the relay end to confirm from which transmit end and through which relay end the receive end receives the data (S905).

The receive end receives the RTS frame transmitted by the transmit end through the relay end (S910). As a response to the RST frame, the receive end transmits the CTS frame indicating that the receive end is ready to receive the data to admit the transmission, to the relay end (S915).

Then, the receive end receives the data of the transmit end from the relay end (S920) and transmits the ACK frame informing that the receive end appropriately receives the data to the relay end (S925).

FIG. 10 is a block diagram showing an example of a wireless communication system performing a relay operation according to an exemplary embodiment of the present invention.

Referring to FIG. 10, the wireless communication system includes a transmit end 1000, a relay end 1030, and a receive end 1060.

The transmit end 1000 includes a transmitter 1005, a receiver 1010, and a processor 1015.

The processor 1015 is operated to attempt setting of a relay link with the relay end through the transmitter 1005 and the receiver 1010. In the case in which the receive end is positioned outside a transmission area of the transmit end, the processor 1015 is operated to search and select the relay end. The processor 1015 generates a relay request frame or an RTS frame.

The transmitter 1005 transmits the relay request frame to the selected relay end.

The transmitter 1005 transmits the RTS frame to the relay end in order to previously block interference due to transmission of neighboring terminals to prevent collision. However, when the RTS frame is included in the relay request frame, the transmission of the RTS frame may be omitted.

The transmitter 1005 transmits data to the relay end.

The receiver 1010 may receive a relay response that the transmitter 1005 transmits to the receive end as a relay response to the relay request.

The receiver 1010 receives a CTS frame indicating that the receive end is ready to receive data to admit transmission, through the relay end.

The receiver 1010 receives an ACK frame through the relay end in the case in which the receive end appropriately receives the data.

Meanwhile, the relay end 1030 includes a transmitter 1035, a receiver 1040, and a processor 1045. The relay end may be a terminal. Alternatively, the relay end may be an AP.

The transmitter 1035 transmits the relay response to the relay request to the receive end (or the transmit end).

The transmitter 1035 transmits the RTS frame to the receive end. Meanwhile, when the RTS frame is included in the relay request frame, the transmission of the RTS frame may be omitted.

The transmitter 1035 transmits the CTS frame to the transmit end.

The transmitter 1035 transmits a relay frame including the data to the receive end.

The transmitter 1035 transmits the ACK frame to the transmit end.

The receiver 1040 receives the relay request frame from the transmit end.

The receiver 1040 receives the RTS frame to the transmit end in order to previously block the interference due to the transmission of the neighboring terminals to prevent the collision.

The receiver 1040 receives the CTS frame indicating that the receive end is ready to receive the data to admit the transmission, from the receive end.

The receiver 1040 receives the data from the transmit end.

The receiver 1040 receives the ACK frame from the receive end in the case in which the receive end appropriately receives the data.

The processor 1045 generates the relay frame including the data.

Meanwhile, the receive end 1060 includes a transmitter 1065, a receiver 1070, and a processor 1075.

The processor 1075 is operated to transmit or receive a control frame to or from the transmit end to attempt connection of a relay link. This is to perform a relay operation in the case in which the receive end is positioned outside a transmission area of the transmit end.

The processor 1075 generates the CTS frame or the ACK frame.

The receiver 1070 receives the relay response from the relay end. Therefore, the receive end may confirm from which transmit end and through which relay end the receive end receives the data.

The receiver 1070 receives the RTS frame transmitted by the transmit end through the relay end.

The receiver 1070 receives the relay frame including the data of the transmit end from the relay end.

As a response to the RTS frame, the transmitter 1065 transmits the CTS frame indicating that the receive end is ready to receive the data to admit the transmission, to the relay end.

The transmitter 1065 transmits the ACK frame informing that the receive end appropriately receives the data to the relay end.

Meanwhile, the processor may include an application-specific integrated circuit (ASIC), other chipsets, a logical circuit, and/or a data processing apparatus.

In addition, the transmit end, the receive end, and relay end may further include a memory in which the data is stored, and the memory may include a read-only memory (ROM), a random access memory (RAM), a flash memory, a memory card, a storage medium, and/or other storage apparatus. When the embodiment is implemented by software, the above-mentioned method may be implemented by a module (process, function, or the like) that performs the above-mentioned function. The module may be stored in the memory and be executed by the processor. The memory may be positioned inside or outside the processor and be connected to the processor by a well-known unit.

According to the exemplary embodiment of the present invention, the data is transmitted to the receive end positioned outside a transmission coverage of the transmit end, such that a wireless LAN service coverage may be expanded.

According to the exemplary embodiment of the present invention, an adjacent terminal connected to the receive end is used as the relay end, such that the transmit end that may not be connected directly to the receive end may communicate with the receive end.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

What is claimed is:

1. A method for transmitting a relay frame in a relay end of a wireless communication system, the method comprising:
receiving, by the relay end, a first relay request frame requesting data transmission to a receive end from a transmit end;

transmitting, by the relay end, a relay response frame including information on data to be relayed to each of the transmit end and the receive end;

receiving, by the relay end, Request To Send (RTS) information from the transmit end;

transmitting, by the relay end, the RTS information to the receive end;

receiving, by the relay end, the data from the transmit end; and generating, by the relay end, a relay frame including the data and transmitting the relay frame to the receive end.

2. The method of claim 1, wherein the relay end is at least one terminal or access point.

3. The method of claim 1, wherein the relay end is a terminal selected among neighboring terminals based on at least one of strength of a signal received in the transmit end, a transmission rate of the received signal, and a destination address.

4. The method of claim 1, further comprising retransmitting, by the relay end, a frame including the data to the transmit end,
wherein the frame including the data includes ACK information of the relay end.

5. The method of claim 1, further comprising:
receiving the RTS information in a request-to-send (RTS) frame from the transmit end, the RTS frame being a control frame for securing a right to use a channel; and
transmitting, by the relay end, the RTS frame to the receive end.

6. The method of claim 1, wherein receiving a relay request frame includes receiving the RTS information, and
wherein transmitting the relay response frame includes transmitting the RTS information.

7. The method of claim 1, further comprising:
receiving a clear-to-send (CTS) frame indicating that the receive end is ready to receive data to admit transmission, from the receive end; and
transmitting the CTS frame to the transmit end.

8. The method of claim 1, further comprising:
receiving an ACK frame indicating that the receive end successfully receives the data, from the receive end; and
transmitting the ACK frame to the transmit end.

9. The method of claim 1, wherein the relay request frame is transmitted when the receive end is positioned outside a transmission area of the transmit end.

10. The method of claim 9, wherein when a beacon frame is not transmitted between the transmit end and the receive end, the relay end determines that the receive end is positioned outside the transmission area of the transmit end.

11. The method of claim 1, wherein the relay frame is a frame of institute electrical and electronics engineers (IEEE) 802.11a/g specifications.

12. The method of claim 1, wherein the relay frame is configured by completely demodulating the data or the relay request frame and then modulating again the demodulated data or relay request frame.

13. The method of claim 12, wherein the relay frame further includes data of the relay end itself to be transmitted to the receive end.

14. The method of claim 1, wherein the relay frame is configured by adjusting a gain and compensating for a carrier frequency offset in the data or the relay request frame.

15. The method of claim 14, wherein the relay frame further includes data of the relay end itself to be transmitted to the receive end.

16. The method of claim 15, wherein each of the data and the data of the relay end itself includes a source address, a destination address, and length information according to a media access control (MAC) frame format.

17. A terminal for transmitting a relay frame in a wireless communication system, the terminal comprising:
a receiver configured to receive a relay request frame requesting data transmission to a receive end from a transmit end and receive Request to Send (RTS) information from the transmit end; and
a transmitter configured to transmit a relay response frame including information on which data is relayed to each of the transmit end and the receive end and transmit the RTS information to the receive end,
wherein the receiver receives data from the transmit end, and
the transmitter transmits a relay frame including the data to the receive end.

18. The terminal of claim 17, wherein the terminal is selected among neighboring terminals based on at least one of strength of a signal received in the transmit end, a transmission rate of the received signal, and a destination address.

19. The terminal of claim 17, further comprising a processor generating the relay frame,
wherein the processor configures the relay frame by completely demodulating the data or the relay request frame and then modulating again the demodulated data or relay request frame.

20. The terminal of claim 17, further comprising a processor generating the relay frame,
wherein the processor configures the relay frame by adjusting a gain and compensating for a carrier frequency offset in the data or the relay request frame.

* * * * *